United States Patent
Welch

(10) Patent No.: US 6,684,514 B2
(45) Date of Patent: Feb. 3, 2004

(54) CENTER SCRIBING KIT FOR USE WITH DRILLING TEMPLATES

(76) Inventor: Robert Welch, 870 N. State Rd. 14, Harper, KS (US) 67058

( * ) Notice: Subject to any disclaimer, the term of this patent is extended or adjusted under 35 U.S.C. 154(b) by 105 days.

(21) Appl. No.: 09/833,544

(22) Filed: Apr. 11, 2001

(65) Prior Publication Data

US 2002/0148120 A1 Oct. 17, 2002

(51) Int. Cl.⁷ .................................................. B26F 1/32
(52) U.S. Cl. ........................................... 30/367; 30/366
(58) Field of Search ............................ 30/366–368, 277

(56) References Cited

U.S. PATENT DOCUMENTS

| | | |
|---|---|---|
| 722,559 A | 3/1903 | Bond |
| 781,947 A | 2/1905 | Hartley et al. |
| 783,749 A | 2/1905 | Hartley et al. |
| 789,520 A | 5/1905 | Adell et al. |
| 802,247 A | 10/1905 | Traxel |
| 813,641 A | 2/1906 | Gilbert |
| 889,409 A | 6/1908 | Spalding |
| 947,391 A | 1/1910 | Michael |
| 1,572,046 A | 2/1926 | Seiler |
| 2,384,707 A | 9/1945 | Sweet |
| 2,675,079 A | 4/1954 | Hughes |
| 2,757,457 A | * 8/1956 | Ziegelski ............ 30/366 |
| 2,787,178 A | 4/1957 | Maxim |
| 2,813,511 A | 11/1957 | Kersten |
| 3,029,512 A | 4/1962 | Saxton |
| 3,172,204 A | 3/1965 | Frey |
| 4,069,586 A | 1/1978 | Skelton |
| 4,713,866 A | 12/1987 | Goldmann et al. |
| 5,791,056 A | 8/1998 | Messina |

* cited by examiner

Primary Examiner—Douglas D. Watts
(74) Attorney, Agent, or Firm—Kenneth H. Jack; Davis & Jack, LLC

(57) ABSTRACT

A center marking assemblage or kit consisting of a stylus retaining quill having an upper end and a lower end; a stylus having an upper driving end and a lower scribing end, the stylus being slidably mounted within the stylus retaining quill, a group of differently sized scribing end centering guides, each guide among the group having a lower circular diameter matching a common drill bit size; and consisting of quick disconnect couplings integral with the lower end of the stylus retaining quill and with the upper ends of the scribing end centering guides, such couplings allowing such guides to be selectively and alternately attached to and removed from the lower end of the stylus retaining quill.

11 Claims, 6 Drawing Sheets

FIG. 2
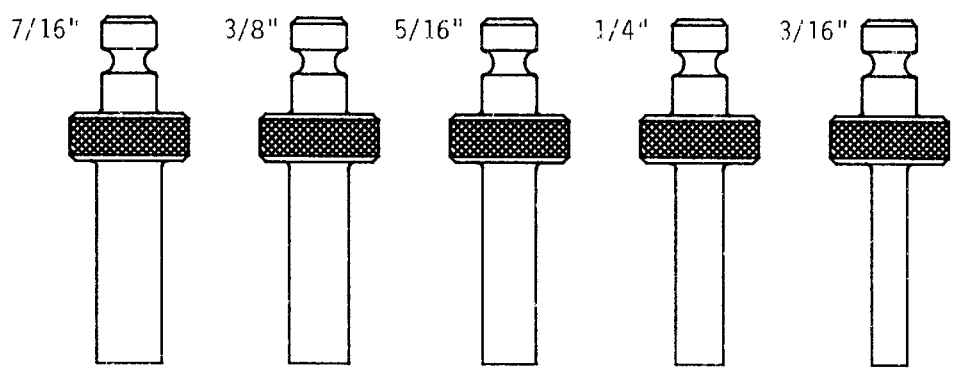
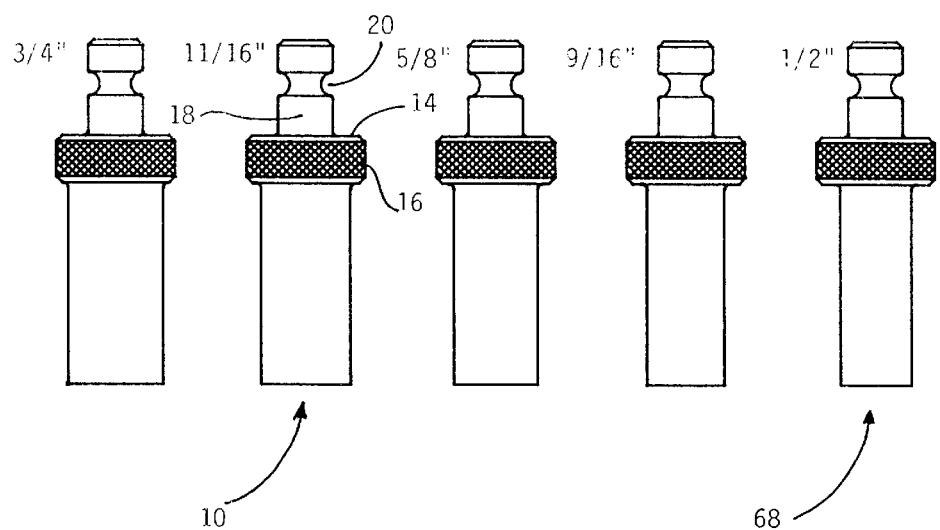

CENTER SCRIBING KIT FOR USE WITH DRILLING TEMPLATES

FIELD OF THE INVENTION

The instant invention relates to template guided drilling. More particularly, the invention relates to apparatus adapted for assisting of machinists in utilizing drilling templates.

BACKGROUND OF THE INVENTION

Drilling templates are commonly serve dual functions of drill site location and tactile/visual assistance in drill bit selection. Where, for example, a drilling template prescribes a square four inch on center pattern of diagonally paired ⅜" and ½" holes, such template will commonly comprise a flat aluminum sheet having holes positioned and sized identically with the holes to be drilled. Such an aluminum sheet template efficiently facilitates tactile/visual selection of the ½" and a ⅜" drill bits needed for drilling. In selecting the drill bits, the operator of the template simply slides a candidate drill bit through one of the template holes to assure that the bit is of the proper gauge. If such bit will not slide through the hole in the template, the bit is immediately identified as too large. Conversely, if the candidate bit fails to closely fill the hole in the template, such bit is identified as being too small.

The exemplary drilling template less efficiently locates the prescribed drilling sites upon the surface to be drilled. Upon placement of such drilling template over such surface, the four drilling sites are known to be at the centers of the four holes of the template. However, the exact locations of the centers are not immediately identified. A skilled machinist may be able to closely approximate the center of each hole utilizing a scratch awl to indent the drilling sites. However, in many applications, the tolerance for inaccuracy in drill site location is beyond the marking capability of a machinist. The instant inventive kit or assemblage assists drilling template operators in performing such drilling site locating function by providing a quill and stylus scribing instrument; the instrument having a plurality of interchangeable scribing point centering guides; such guides matching common gauges of drill bits.

BRIEF SUMMARY OF THE INVENTION

A primary structural component of the inventive assemblage or kit comprises a hollow bored stylus retaining quill having an open upper end, and having an open lower end. Preferably, the upper end of the annular outer surface of the stylus retaining quill is spirally threaded for threaded mounting thereover of an apertured slide stopping cap. Also preferably, the lower end of the annular inner wall of the stylus retaining quill forms an upwardly oriented coffered step or slide stopping ridge. Also preferably, a conical ball receiving aperture extends through the wall of the stylus retaining quill at its lower end. Also preferably, the annular outer surface of the stylus retaining quill is knurled for resisting slippage during manual handling.

A second primary structural component comprises a stylus having an upper driving end and a lower scribing end. The stylus is necessarily slidably mounted within the hollow bore of the stylus retaining quill. Preferably, the upper driving end of the stylus forms an annular upwardly oriented slide stopping ridge or coffered step which is engageable with the undersurface of the apertured slide stopping cap, such engagement limiting upward sliding motion of the stylus. Also preferably, at a point below said upwardly oriented slide stopping ridge, the stylus further forms a downwardly oriented slide stopping ridge or coffered step. Preferably, the lower end of the stylus extends through a helical spring whose upper end biases against said downwardly oriented slide stopping ridge, and whose lower end biases against or is mechanically linked to an upwardly oriented slide stopping ridge or coffered stop which is milled into the inner wall of the stylus retaining quill. For secure engagement of the lower end of the helical spring with said upwardly oriented slide stopping ridge, an upwardly opening spring receiving cup having an apertured floor is preferably disposed between the lower end of the helical spring and said upwardly oriented slide stopping ridge. Preferably, the annular outer surface of said cup has an annular flange which is engageable with said upwardly oriented slide stopping ridge for limiting downward sliding motion of the stylus. According to the aforedescribed configuration, the stylus extends axially through the helical spring and through the aperture within the floor of said cup.

Said helical spring normally upwardly positions the stylus within the hollow bore of the stylus retaining quill so that the upper driving end of the stylus protrudes upwardly through the apertured slide stopping cap, and so that the upwardly oriented slide stopping ridge of the stylus engages the undersurface of said cap. Preferably, the stylus is jointed at a point above its downwardly oriented slide stopping ridge; the joint allowing, upon wear or degradation of the lower scribing end of the stylus, replacement of the lower end of the stylus.

Preferably, the lower scribing end of the stylus forms a conical point for indenting drilling sites upon surfaces. Alternately and suitably, the lower scribing end of the stylus may incorporate a printing means, such as an ink or graphite marker, such means depositing drilling site locating indicia rather than indenting a surface.

The present inventive assemblage necessarily further comprises a plurality of differently sized scribing end centering guides for centering the lower end of the stylus within a template aperture. Preferably, each scribing end centering guide has an upper end adapted for interchangeable attachment to the lower end of the stylus retaining quill. Also preferably, each scribing end centering guide has a lower end closely fitted to the inside diameter of an aperture drilled by a commonly sized drill bit. As such apertures are typically circular, the lower end of each scribing end centering guide is preferably circular. Alternately and suitably, the lower ends of the scribing end centering guides may be configured as a plurality of radially arranged bearing surfaces positioned for contact with the annular wall of a circular template aperture. Ideally, each scribing end centering guide is configured as a second quill whose hollow bore forms, upon attachment to the lower end of the stylus retaining quill, a passage which is continuous with the hollow bore of the overlying quill. Such alignment of hollow bores allows the stylus to extend both through the bore of the stylus retaining quill and through the bore an attached second quill.

A preferred interchangeable attaching means for alternate selective attachments of the scribing end centering guides to the lower end of the stylus retaining quill comprises a quick disconnect coupling such as a floating ball locking slip joint wherein a ball bearing alternately engages with and disengages from an annular ball receiving channel milled within the upper ends of centering guides. Alternate suitable interchangeable attaching means include spring biased ball and detent locking slip joints, spring leaf and detent locking slip joints, ridge and channel locking slip joints, hook and channel locking slip joints, hook and ridge locking slip joints, lug and "L" slot locking slip joints, lug and "L" channel locking slip joints, frictionally attached slip joints, free sliding slip joints, and spirally threaded joints.

In use of the inventive assemblage (further referring to the exemplary four inch square drilling template described above) such template is precisely positioned and held at a desired location upon a surface to be drilled. Upon such positioning, the assemblage is operated by selecting a centering guide having an outside diameter of ⅜". Said guide is then attached to the lower end of the stylus retaining quill. The lower end of said guide is then inserted into one of the ⅜" apertures of the template until the lower surface of the guide rests upon the surface to be drilled. A percussive striking force is then applied to the upper driving end of the stylus, driving the lower scribing end of the stylus into the surface to be drilled, accurately forming an indentation, accurately marking one of the ⅜" drilling sites. Alternately, where the lower scribing end of the stylus is configured for application of printed indicia rather than a surface indentation, pressurized contact, as opposed to percussive contact, may be applied to the upper driving end of stylus. The tool is then withdrawn and inserted into the diagonally opposed ⅜" aperture of the template. There, a similar percussive striking force is applied. The tool is then withdrawn from the template, the ⅜" guide is removed, and is replaced by a ½" centering guide. Center marking of both ½" apertures of the template then proceeds in a manner identical to the markings of the ⅜" apertures.

Preferably, the inventive assemblage is configured as a kit containing a quill and stylus assembly, and containing groupings of second quills matching common drill bits. Kits matching numbered, alphabetically lettered, English, or metric drill bit sizes may be provided.

Accordingly, it is an object of the present inventive assemblage to provide a surface scribing stylus slidably mounted within a quill, and to further provide a plurality of differently sized interchangeable scribing end centering guides. It is a further object of the present invention to provide such an assemblage capable of efficiently and economically performing center marking within drilling templates.

Other and further objects, benefits, and advantages of the present invention will become known to those skilled in the art upon review of the Detailed Description which follows, and upon review of the appended drawings.

BRIEF DESCRIPTION OF THE DRAWINGS

FIG. 2 includes side views of an exemplary set or assemblage of scribing end centering guides.

DETAILED DESCRIPTION OF A PREFERRED EMBODIMENT

Figure 1:
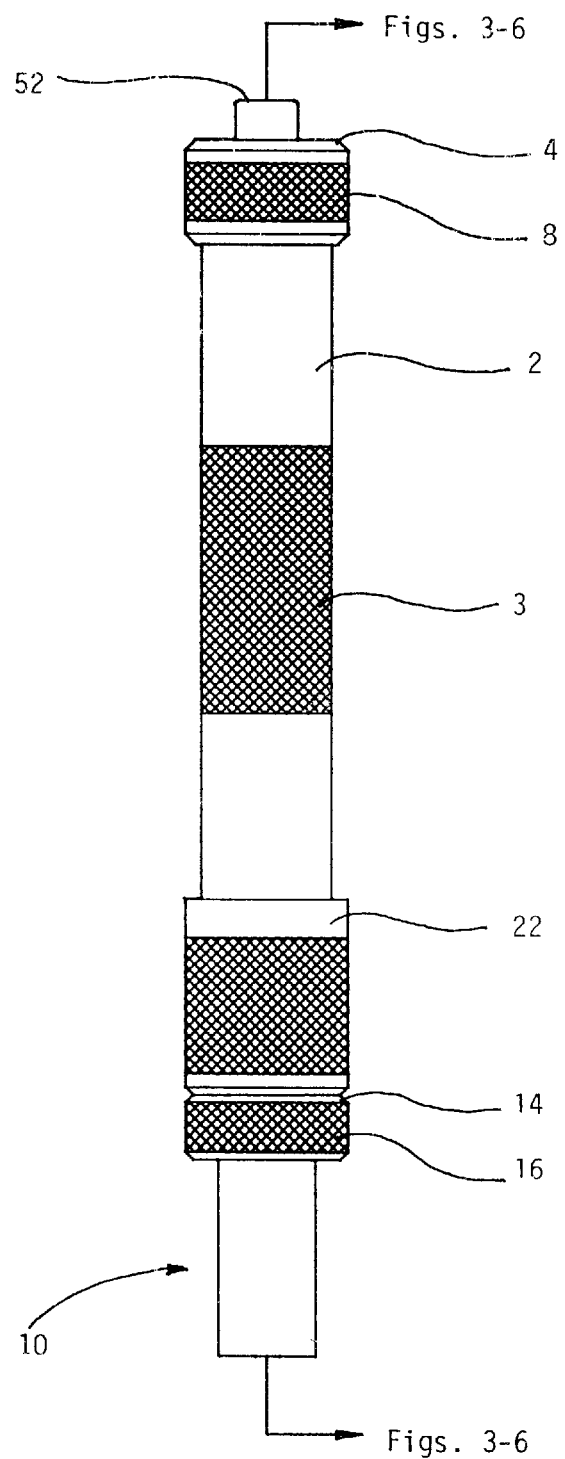
FIG. 1 is a side view of the quill and stylus assembly of the instant invention, such assembly having an exemplary interchangeably attached stylus end centering guide configured as a second quill.

Referring now to the drawings, and in particular to FIG. 1, a hollow bored stylus retaining quill 2 has knurling 3 upon its annular outer surface, the knurling facilitating slip free manual handling. An apertured cap 4 is fixedly and removedly attached to the upper end of the stylus retaining quill 2, preferably by means of, referring to FIG. 3, spiral threading 6. Referring again to FIG. 1, the apertured cap 4 has a knurled surface 8 for non-slip turning and counter-turning for cap removal and cap attachment.

Referring simultaneously to FIGS. 1 and 2, an exemplary ¹¹⁄₁₆" scribing end centering guide is designated by reference arrow 10. Referring to FIG. 1, said guide 10 is interchangeably attachable to the lower end of stylus retaining quill 2. The lower end of said scribing end centering guide 10 is preferably circularly configured for insertion into common ¹¹⁄₁₆" diameter apertures of drilling templates. For ease of insertion and extraction of the lower end of such scribing end centering guide 10 into such ¹¹⁄₁₆" (or 0.6875") circular aperture, the true outside diameter of such guide is preferably milled to 0.687", allowing for free sliding insertion into such aperture.

Figure 3:
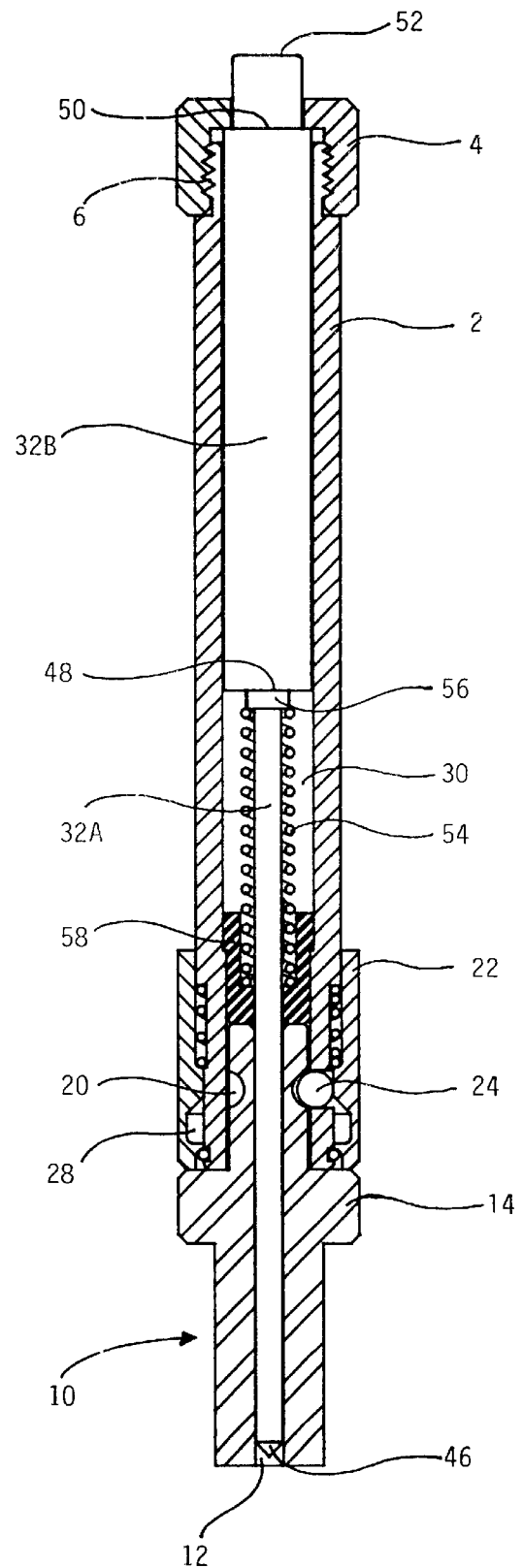
FIG. 3 is a sectional view as indicated in FIG. 1.

Referring simultaneously to FIGS. 2 and 3, the scribing end centering guide 10 is preferably configured as a quill having a hollow bore 12. Suitably, the lower end of scribing end centering guide 10 may be configured other than circularly so long as such end presents bearing surfaces sufficient for centering within a circular aperture of a drilling template.

Referring again to FIGS. 1 and 2, the scribing end centering guide 10 preferably has a slide stopping ridge 14, such ridge having an annular knurled surface 16 for slip free manual handling.

Figure 5:
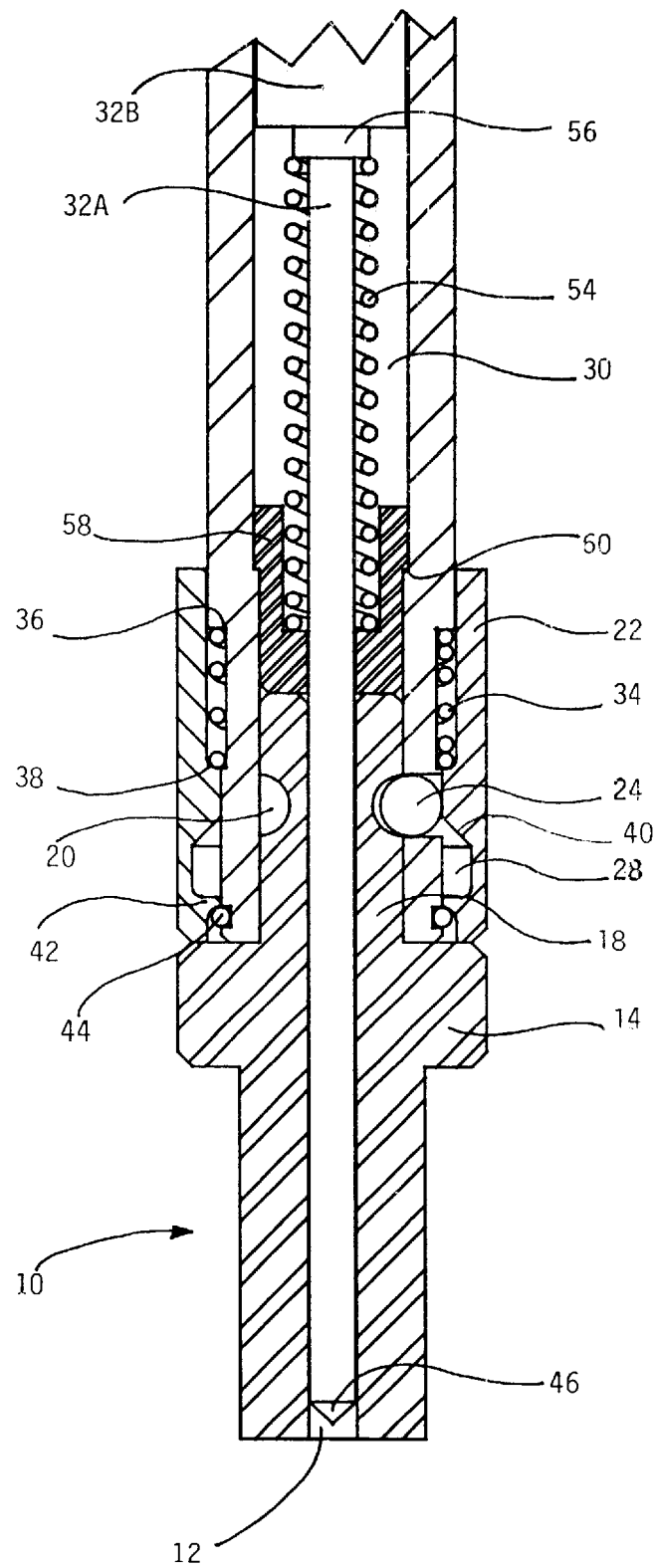
FIG. 5 is a magnified detail of the view of FIG. 3.
Figure 6:
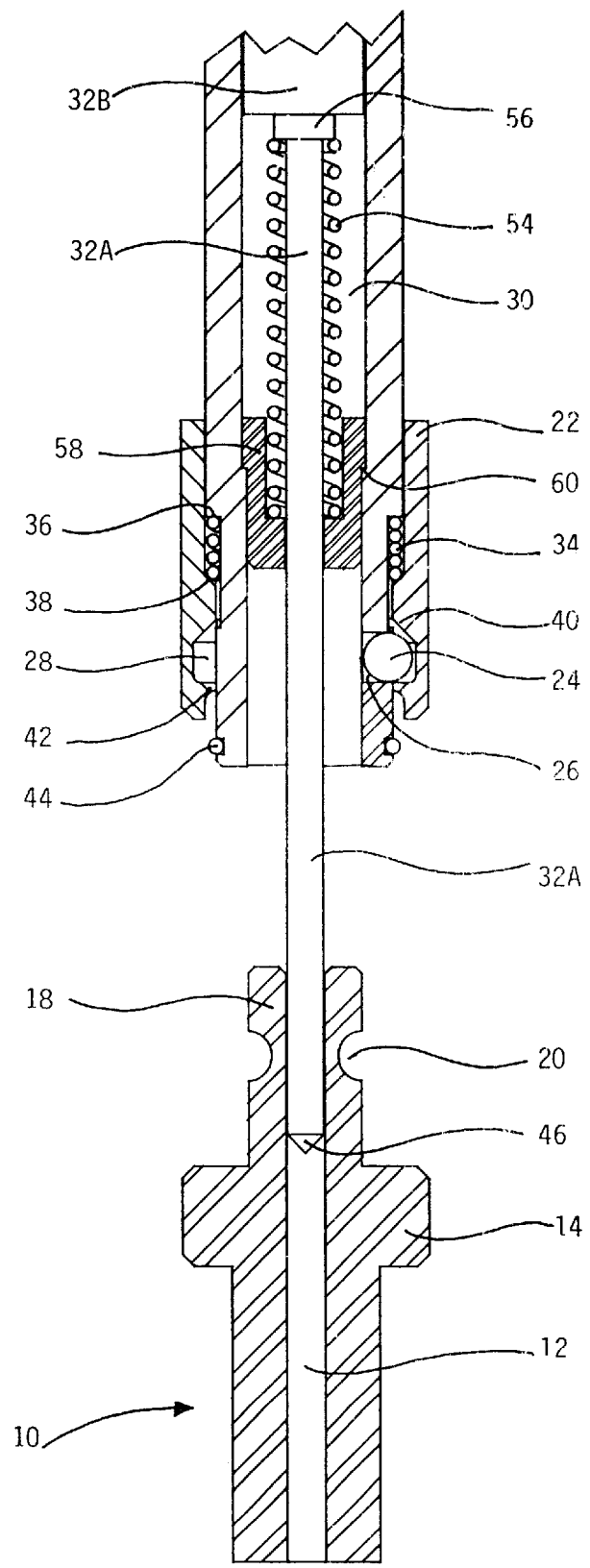
FIG. 6 redepicts FIG. 5, the view showing the scribing end centering guide positioned for interchangeable attachment.

Referring simultaneously to FIGS. 1, 2, and 3, the upper end of the scribing end centering guide 10 preferably forms the male end 18 of a quick disconnect coupling, such end 18 having an annular ball receiving channel 20. Referring to FIG. 6, installation of the scribing end centering guide 10 upon the lower end of the stylus retaining quill 2 may be accomplished by first slidably upwardly moving slide sleeve 22. Upon such upward sliding motion, ball bearing 24 is freed for lateral rolling motion within a conical channel 26 extending through the side wall of stylus retaining quill 2. By rolling outwardly within said channel 26, ball 24 simultaneously rests within said channel and within an inwardly opening annular channel 28 of slide sleeve 22. Upon such lateral motion of ball 24, the lower end of the hollow bore 30 of stylus retaining quill 2 is cleared for receipt of end 18 of the quick disconnect coupling. Referring simultaneously to FIGS. 5 and 6, scribing end centering guide 10 is slidably mounted over the lower end of stylus 32A, causing said stylus to extend downwardly through hollow bore 12. Upward sliding motion of scribing end centering guide 10 continues until the upper slide stopping surface of ridge 14 meets the lower end of the stylus retaining quill 2, as depicted in FIG. 5.

Referring to FIG. 6, upon full extension of end 18 into the lower end of hollow bore 30, slide sleeve 22 is released. Helical spring 34 biases between opposing annular ridges 36 and 38; and upon release of the slide sleeve 22, spring 34 drives slide sleeve 22 downwardly. As slide sleeve 22 moves downwardly, a chamfered or beveled annular ridge 40 drives ball bearing 24 laterally inward through a conical channel 26 to a position wherein ball bearing 24 simultaneously rests within hollow channel 30 and conical channel 26 as depicted in FIG. 5. Slide stopping ridge 42 engages removable pressure ring 44, stopping downward sliding motion of slide sleeve 22. Upon such inward ball positioning, ball bearing 24 engages channel 20, latching the scribing end centering guide 10 in place. Removal of scribing end centering guide 10 is accomplished through a reverse of the steps described above.

While a quick disconnect coupling of the type depicted in FIGS. 5 and 6 is a preferred interchangeable attaching means, it can be seen that the respective lower and upper ends of the stylus retaining quill 2 and the scribing end centering guide 10 may be configured in conformity with numerous commonly known interchangeable attaching means. All such interchangeable attaching means are considered to fall within the scope of the invention.

Referring to FIG. 3, the stylus is referred to by reference numerals 32A and 32B, signifying that the stylus may be suitably configured either as a jointed or a non-jointed article. Through prolonged use of the stylus, its pointed scribing end 46 may become dulled. By providing a joint 48 between the upper and lower ends 32B and 32A of the stylus, the lower end 32A of the stylus may be economically disposed of and replaced without necessitating a disposal of the upper end 32B.

Further referring to FIG. 3, the upper end of stylus 32B preferably forms a coffered inset or step, providing an upwardly oriented slide stopping ridge 50, such ridge engaging the undersurface of apertured cap 4, such engagement limiting upward sliding motion of the stylus. Preferably, the upper end of stylus 32B is flat, forming a percussive or pressurized contact surface 52. Necessarily, the vertical dimension of the upper coffered section of the upper end of stylus 32B is tailored so that the percussive contact surface 52 extends above the upper surface of the apertured cap 4 a distance greater than the distance between the point of the scribing end 46 and the lower end of the scribing end centering guide 10. Such tailoring of vertical dimensions assures that striking or pressurized contact applied to surface 52 will drive scribing end 46 downwardly below the lower end of scribing end centering guide 10.

Referring to FIG. 5, stylus 32B and 32A is preferably biased in a normally upwardly retracted position by helical spring 54, the upper end of helical spring 54 pressing against an enlarged head 56 formed integrally with the upper end of the lower stylus section 32A, and the lower end of helical spring 54 pressing against the floor of an apertured cup 58. Preferably, the inner wall of the hollow bore 30 of quill 2 and the outer wall of the apertured cup 58 are interlockingly coffered, forming annular slide stopping ridges 60, such ridges 60 preventing the apertured cup 58 from being driven downwardly through the hollow bore 30 by helical spring 54.

Figure 4:
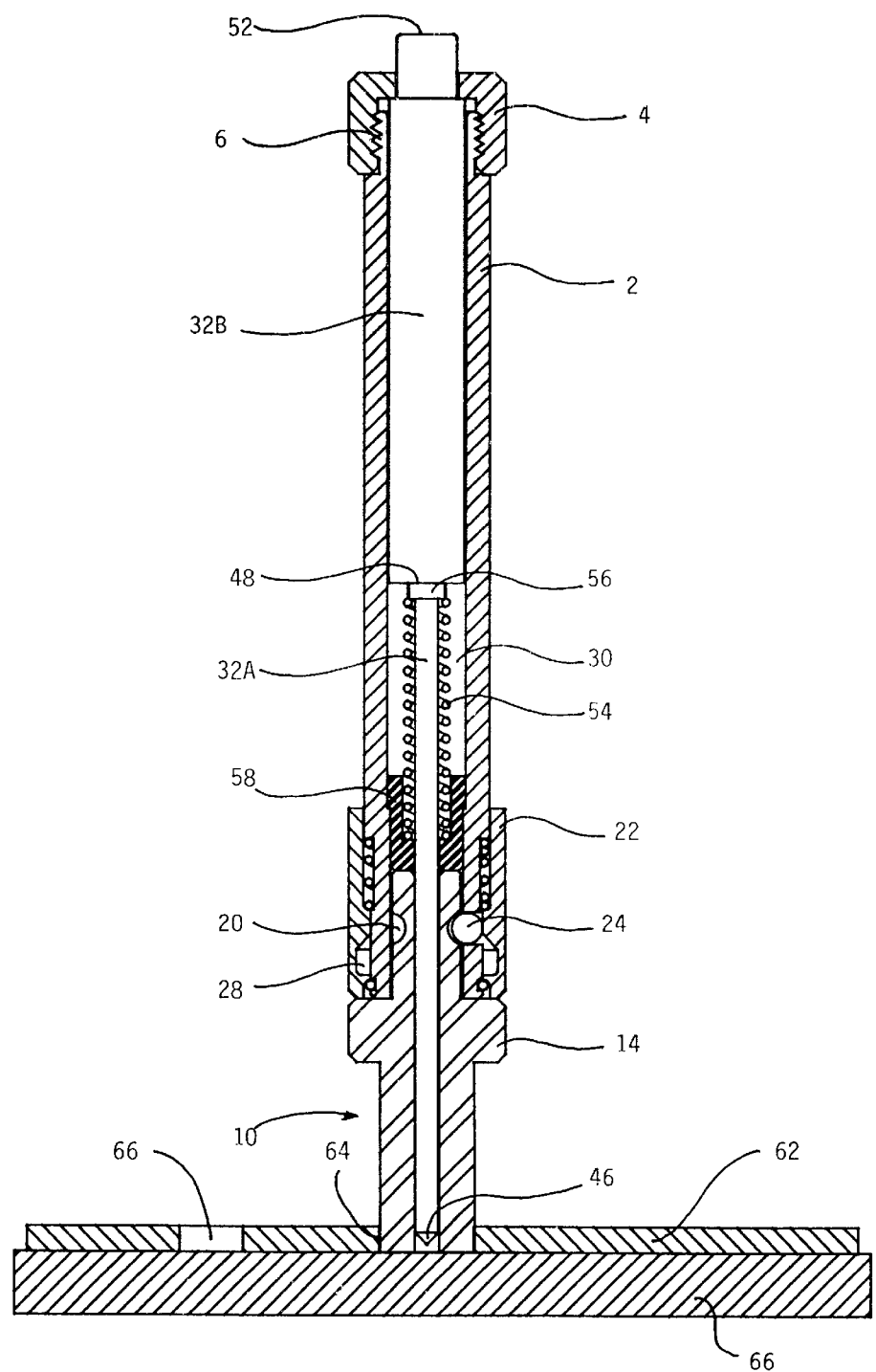
FIG. 4 redepicts FIG. 3, shown in use with a template upon a surface to be scribed and drilled.

In use or operation of the inventive assemblage, a drilling template 62 having an $^{11}/_{16}$" aperture 64 and a ½" aperture 66 is placed over a surface to be drilled, such as a metal sheet 66. The lower end of scribing end centering guide 10 is then inserted into aperture 64. A percussive striking force, such as that supplied by a hammer blow, is then applied to surface 52, driving the point of scribing end 46 downwardly into sheet metal 66, creating an indented drill bit guiding mark at the precise center of aperture 64. Thereafter, the tool is withdrawn from aperture 64 and, centering guide 10 is removed from quill 2 through upward retraction of slide sleeve 22. Thereafter, referring simultaneously to FIGS. 2 and 4, ½" centering guide 68 is attached to the lower end of quill 2, and the lower end of guide 68 is inserted into ½" aperture 66. A percussive striking force is then against applied to surface 52, producing a second indentation at the center of aperture 66. Through repetition of the procedure described above, the exact centers of numerous apertures of varying sizes within a template may be quickly and conveniently marked.

FIG. 2 is representative of a wide variety of assemblages of scribing end centering guides which may be included as a part of the instant inventive kit or assemblage. The centering guides depicted in FIG. 2 are intended for use in conjunction with English unit drill bits and drilling templates whose diameters are upon fractions of an inch. Where the instant inventive assemblage is to be utilized in conjunction with English unit drill bits and templates, it is preferred that the outside diameters of the centering guides be selected from sizes $^{3}/_{16}$", ¼", $^{5}/_{16}$", ⅜", $^{7}/_{16}$", ½", $^{9}/_{16}$", ⅞", $^{15}/_{16}$", and 1 inch. Where the assemblage is for use in conjunction with numerically sized drill bits, it is preferred that the outside diameters of the centering guides be selected from numbered sizes 1–25. Where the assemblage is for use in conjunction with alphabetically sized drill bits, it is preferred that the outside diameters of the centering guides be selected from lettered sizes A through Z. Where the assemblage is for use in conjunction with metric sized drill bits, it is preferred that the outside diameters of the centering guides be selected from metric sizes 5 mm through 25 mm.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A center marking assemblage comprising:
   (a) a stylus retaining quill having an upper end and a lower end;
   (b) a stylus having an upper driving end and a lower scribing end, the stylus being slidably mounted within the stylus retaining quill;
   (c) a plurality of differently sized scribing and centering guides, each having a lower end, the lower end of each scribing end centering guide having a single outside diameter, each scribing end centering guide comprising a distinct article with respect to the stylus retaining quill; and,
   (d) interchangeable attaching means, adapting the scribing end centering guides for alternate selective attachments to the lower end of the stylus retaining quill; each stylus centering guide comprising a second quill having a cylindrical lower end, the cylindrical lower end having a diameter, said diameter being unique with respect to the diameters of the lower ends of the other second quills; the stylus retaining quill comprising an inner wall, and the stylus comprising an outer wall, said inner and outer walls comprising a plurality of slide stops.

2. The center marking assemblage of claim 1 further comprising spring biasing means normally upwardly positioning the upper driving end of the stylus for downward percussive or pressurized contact.

3. The center marking assemblage of claim 1, wherein the interchangeable attaching means comprises a fastener selected from the group of floating ball locking slip joints, spring biased ball and detent locking slip joints, spring leaf and detent locking slip joints, ridge and channel locking slip joints, hook and channel locking slip joints, hook and ridge locking slip joints, lug and "L" slot locking slip joints, lug and "L" channel locking slip joints, frictionally attached slip joints, free sliding slip joints, and spirally threaded joints.

4. The center marking assemblage of claim 1, wherein the diameter of the cylindrical lower end of each second quill is closely fitted to a dimension selected from the group of alphabetically lettered drill bit sizes.

5. The center marking assemblage of claim 1, wherein the diameter of the cylindrical lower end of each second quill is closely fitted to a dimension selected from the group of numbered drill bit sizes.

6. The center marking assemblage of claim 1, wherein the diameter of the cylindrical lower end of each second quill is closely fitted to a dimension selected from the group of English drill bit sizes.

7. The center marking assemblage of claim 1, wherein the diameter of the cylindrical lower end of each second quill is closely fitted to a dimension selected from the group of metric drill bit sizes.

8. The center marking assemblage of claim 6, wherein each alphabetically lettered drill bit size is selected from the group of sizes A through Z.

9. The center marking assemblage of claim 7 wherein each numbered drill bit size is selected from the group of sizes 1 through 25.

10. The center marking assemblage of claim 8 wherein each English drill bit size is selected from the group of sizes $3/16"$, $1/4"$, $5/16"$, $3/8"$, $7/16"$, $1/2"$, $9/16"$, $5/8"$, $11/16"$, $3/4"$, $13/16"$, $7/8"$, $15/16"$, and $1"$.

11. The center marking assemblage of claim 9 wherein each metric drill bit size is selected from the group of sizes 5 mm through 25 mm.

* * * * *